(12) United States Patent
Tercsinecz (10) Patent No.: US 9,886,661 B1
(45) Date of Patent: Feb. 6, 2018

(54) RFID TAG AND METHODS OF USE AND MANUFACTURE

(71) Applicant: Smarthin Technologies, Inc., Milpitas, CA (US)

(72) Inventor: Martin Tercsinecz, Esztergom (HU)

(73) Assignee: Smarthin Technologies, Inc., Milpitas, CA (US)

( * ) Notice: Subject to any disclaimer, the term of this patent is extended or adjusted under 35 U.S.C. 154(b) by 0 days.

(21) Appl. No.: 15/342,779

(22) Filed: Nov. 3, 2016

(51) Int. Cl.
*G06K 19/06* (2006.01)
*G06K 19/077* (2006.01)
*G06K 19/07* (2006.01)

(52) U.S. Cl.
CPC ... *G06K 19/07767* (2013.01); *G06K 19/0717* (2013.01); *G06K 19/07758* (2013.01)

(58) Field of Classification Search
USPC ........................................ 235/451, 488, 492
See application file for complete search history.

(56) References Cited

U.S. PATENT DOCUMENTS

| | | | | |
|---|---|---|---|---|
| 5,574,470 | A * | 11/1996 | de Vall | G06K 7/10336 340/572.7 |
| 5,973,598 | A * | 10/1999 | Beigel | G06K 19/067 29/595 |
| 7,647,663 | B2 | 1/2010 | Kim et al. | |
| 8,922,435 | B2 | 12/2014 | Fontecchio et al. | |
| 9,064,199 | B2 | 6/2015 | Nitta | |
| 2007/0007344 | A1 | 1/2007 | Inoue et al. | |
| 2007/0085685 | A1 | 4/2007 | Phaneuf et al. | |
| 2007/0215377 | A1 * | 9/2007 | Aoki | H01L 51/0529 174/250 |

(Continued)

FOREIGN PATENT DOCUMENTS

| | | |
|---|---|---|
| EP | 2362329 A1 | 8/2011 |
| JP | 2015129989 A | 7/2015 |

(Continued)

OTHER PUBLICATIONS

International Search Report, PCT/US2016/061857, dated Aug. 16, 2017.

(Continued)

*Primary Examiner* — Tuyen K Vo
(74) *Attorney, Agent, or Firm* — Ellenoff Grossman & Schole LLP (57) ABSTRACT

Thin RFID (Radio Frequency Identification) tags that are waterproof, made of materials able to withstand high pressure, hot and cold temperatures, and durable enough for a wide variety of applications, including being attached, affixed to, woven in, or otherwise enclosed within clothing, towels, linen, or other laundry, or affixed to other products, including consumer products, food products, and other goods and inventory. The tags have up to two antennas printed from a conductive ink solution comprising DuPont e782 Silver ink, graphite, and neodymium on a substrate foil made of materials including ST505 PET polymide, polyester, kapton, or a combination of ST505 PET polymide and kapton, Information stored on such RFID tags can be read using a variety UHF readers or a smartphones using RFID or Bluetooth or other forms of wireless communication.

29 Claims, 7 Drawing Sheets

(56) References Cited

U.S. PATENT DOCUMENTS

| | | | |
|---|---|---|---|
| 2008/0122631 A1* | 5/2008 | Kodukula | G06K 19/0723 |
| | | | 340/572.8 |
| 2010/0081895 A1* | 4/2010 | Zand | A61B 5/0002 |
| | | | 600/309 |
| 2010/0090016 A1* | 4/2010 | Koyama | G06K 19/07345 |
| | | | 235/492 |
| 2010/0231362 A1* | 9/2010 | Smith | G06K 19/0707 |
| | | | 340/10.42 |
| 2012/0061473 A1* | 3/2012 | Forster | G06K 19/07718 |
| | | | 235/492 |
| 2012/0217307 A1 | 8/2012 | Martin et al. | |
| 2014/0103117 A1 | 4/2014 | Takeuchi et al. | |
| 2014/0159871 A1* | 6/2014 | Ku | G06K 19/0723 |
| | | | 340/10.4 |
| 2015/0186768 A1* | 7/2015 | Peters | G06K 19/07773 |
| | | | 235/488 |

FOREIGN PATENT DOCUMENTS

| | | |
|---|---|---|
| KR | 200459018 Y1 | 3/2012 |
| WO | 2005062246 A1 | 7/2005 |
| WO | 2008002083 A1 | 1/2008 |

OTHER PUBLICATIONS

Written Opinion of the International Searching Authority, PCT/US2016/061857, dated Aug. 16, 2017.

* cited by examiner

RFID TAG AND METHODS OF USE AND MANUFACTURE

FIELD OF THE INVENTION

RFID, or Radio Frequency Identification, is a technology where information stored on a microchip can be read remotely, without physical contact using energy in the RF spectrum. An RFID system consists of a reader, or interrogator, which emits an RF signal via an antenna. The microchip receives energy via an attached antenna (termed an RFID tag) and varies the electromagnetic response its antenna in such a way that information can be transferred to the reader.

The present invention relates to RFID devices and their manufacture and use, and in particular, to RFID (Radio Frequency Identification) tags that are waterproof, made of materials able to withstand high pressure, hot and cold temperatures, and durable enough be used in a wide variety of applications, including being attached, affixed to, woven in, or otherwise enclosed within clothing, towels, linen, or other laundry that is washed in washing machines, or affixed to other products, including consumer products, food products, and other goods and inventory. Such tags are capable of reuse in certain applications.

Information stored on such RFID tags can be read using mobile UHF readers or a smartphones using RFID or Bluetooth or other forms of wireless communication known to those skilled in the art. Alternatively, such tags can be read with gate readers designed for use in retail or industrial environments known to those skilled in the art. The tags also can be used as a security or monitoring device or as a way of expediting calculating purchase prices of goods at checkout stations.

RFID tags must be designed to be durable. Such tags may be attached to sheets or towels, table napkins, hand towels used commercially used at hotels, gyms, and restaurants. Commercial sheets, towels, and napkins are used and washed over and over, typically in bulk at large scale, industrial laundry service providers, where they are washed together.

When extracting water from laundry, such as sheets, after washing the laundry with water, for example, the laundry service provider sometimes puts a large amount of laundry in a huge container and extracts water from the laundry by pressing the laundry with a huge piston from above the container in order to enhance washing efficiency. RFID tags attached to the laundry can sometimes be damaged by a breakage in connecting portions between the IC chip and the circuit part and the circuit itself. Such tags may also be attached to paper boxes, foils, metals, parts, plastics, wooden products, glass and any consistent materials and also need to be able to withstand potential damage and breakage in those applications.

BACKGROUND

There are known, prior art designs and methods of manufacture for RFID tags. For example, U.S. Pat. No. 9,064,199 (Nitta) describes a flexible RFID tag design with a continuous body that includes an RFID antenna that is close to the flexible material. The RFID antenna tag base itself is made of a flexible material. The antenna is configured as a conductive thread.

The tag base is attachable to a flexible material product and has an RFID inlay or module provided for the tag base, having an IC chip and an RFID antenna, and capable of performing wireless data communication. The tag base is comprised of a flexible material, and the RFID antenna includes a base antenna portion configured by integrating a conductive thread into the tag base, including by weaving or sewing. The RFID inlay or module may include: the IC chip; an inlay antenna portion connected to the IC chip; and a protecting member configured to protect the inlay antenna portion and the IC chip.

Other approaches also use conductive thread antennas of different shapes with epoxy resin. The conductive thread approaches result in tags with antennas that are more susceptible to breaking easily. Tags made with conductive thread typically require larger tag sizes due to the relatively greater thickness of the conductive thread. The larger tag sizes required with a conductive thread approach can damage clothing, laundry or other materials in which the tags are used.

Still other prior art approaches construct the antenna from milled foil of aluminum glued on the top of the substrate and do not use epoxy resin to strengthen connection of the platform of the chip and the connection points of antenna. Tags made using these approaches are more susceptible to damage at the connection portions between the antennas and integrated circuit.

There are prior art approaches that use silver conductive ink to print the antenna onto the surface of the substrate using a stencil printing process to provide the conductive ink on the substrate. With this approach, shapes are milled from the substrate using a stencil knife tool. But multiple layers of conductive ink cannot be applied on the same surface. This affects the reading distance and accuracy of the resulting tags.

Another approach using conductive ink for the antenna prints the ink from a jet ink printer as is described in U.S. Pat. No. 8,922,435. These approaches do not enable multiple layers of ink to be printed on the same surface which adversely affects the quality of the tag and its ability to be read in terms of accuracy and distance. Yet another approach is described in U.S. Pat. Pub. No. 2007/007344 (Inoue et al.), in which the antenna is formed using conductive paste, which has a high resistance and also results in inferior performance.

What is needed is a design for an RFID tag that is thin, flexible, durable, capable of being used and reused in a wide variety of applications, including applications where the tags are subject to water, extreme hot and cold temperatures, and other stresses which can damage or break the tags, able to be read efficiently, quickly, and in bulk using a wide variety of readers, yet be able to be produced efficiently and at a lower cost than prior art designs and methods of manufacture. The present invention achieves these advantages without the drawbacks and problems of prior art designs and provides improved performance in reading accuracy, distance, and speed.

SUMMARY OF THE INVENTION

As described in detail herein below, the devices and methods of manufacture and production described herein employ a novel design for a thin RFID tag and methods of production and manufacture that combine durability and effectiveness for a wide variety of applications and achieve significant cost savings over prior art approaches and provides advantageous durability and performance using a wide variety of readers.

The design includes printing at least one antenna (and preferably two) on a substrate carrier foil. The antenna is preferably needle shaped and printed using a printing technology that enables multiple layers of a conductive ink solution to be printed on the same surface that dry faster and result in improved reading performance. When one antenna is used, two resonance amplifiers are necessary. When two antennas are used, they can be symmetrically offset across a longitudinal centerline at at least four offset points and four resonance amplifiers are necessary. The four resonance amplifiers are printed on the substrate carrier at the offset points and a UHF RFID circuit integrated into the first substrate carrier at the at least four offset points.

Despite the dense texture, the conductive ink solution ink is easily applicable on the resin due to the using of a high resolution screen canvas. The antennas remain flexible after drying and become more durable than the RFID tags of other companies. The inventive conductive ink solution can be applied to textile and the foil substrates described herein to enhance the functioning of the thin, RFID tag as described herein.

In accordance with a first aspect of the invention an RFID tag is provided comprising a first substrate comprising a flexible waterproof material and configured to include a substrate carrier foil comprising at least a first antenna printed on the substrate carrier foil from a conductive ink liquid solution; at least a first and second resonance amplifier printed on the substrate carrier foil and connected to the at least one antenna; a UHF RFID circuit integrated into the first substrate carrier foil at the at least one antenna; and a second substrate carrier configured to cover the first substrate carrier and the UHF RFID circuit, wherein the substrate carrier foil comprises kapton and the first antenna has a length of 5 to 255 mm, a width of and 0.005 to 5 mm in width, and a thickness of 0.05 to 9 mm.

In another embodiment, the substrate carrier foil comprises ST505 PET polymide. In another embodiment, the substrate carrier foil comprises polyester. In another embodiment, the substrate carrier foil further comprises kapton laminate.

In another embodiment, the tag further comprises a second antenna printed on the substrate carrier foil from the conductive ink solution, wherein the second antenna has a length of 5 to 255 mm, a width of and 0.005 to 5 mm in width, and a thickness of 0.05 to 9 mm. In other embodiments, the antennas are needle shaped.

In another embodiment, the tag further comprises a second antenna printed on the substrate carrier foil from the conductive ink solution, wherein the second antenna has a length of 5 to 255 mm, a width of and 0.005 to 5 mm in width, and a thickness of 0.05 to 9 mm and the first antenna and the second antenna are symmetrically offset across a longitudinal centerline at at least four offset points, further comprising third and fourth resonance amplifiers, wherein the third and fourth resonance amplifiers are printed on the substrate carrier foil at two of the four offset points.

In another embodiment, the conductive ink solution comprises 65-75% DuPont e782 Silver ink, 15-25% graphite, and 5-15% neodymium.

In another embodiment, the tag is configured to read at least 150 tags per second at a range of up to 4 meters with a mobile UHF reader or at least 950 tags per second at a distance of up to 10 meters using a gate reader.

In accordance with a second aspect of the invention, a method of manufacturing an RFID tag is provided comprising loading rolled foil in a feeding unit; unrolling the foil to a printer unit comprising a squeegee and press screen having holes; passing the unrolled foil underneath the press screen; moving the squeegee of the printing unit back and forth over the press screen to dispense a preset amount of conductive ink solution at a preset pressure on the foil through the press screen to create at least one needle shaped antenna on the foil of 5-255 mm in length, 0.05-5 mm in width, and a thickness of 0.05-0.9 nm; passing the unrolled foil to a drying unit; subjecting the unrolled foil to heat in at least two heating units to dry the at least two needle shaped antennas on the foil; loading the unrolled foil in a bonding unit; dispensing epoxy resin from the bonding to the unrolled foil; mounting an ultra-high frequency (UHF) RFID integrated circuit to the unrolled foil with the epoxy resin at at least two points of the at first antenna; mounting at least two resonance amplifiers to the unrolled foil at at least two points of the antenna; placing the foil in a first, flexible, waterproof substrate carrier and covering and sealing the first substrate carrier with second substrate carrier configured to cover the first substrate carrier and the UHF RFID circuit.

In another embodiment, wherein the unrolled foil comprises kapton

In another embodiment, the unrolled foil comprises ST505 PET polymide. In another embodiment, the unrolled foil further comprises polyester. In another embodiment, the unrolled foil further comprises kapton laminate. In another embodiment, the conductive ink solution comprises DuPont e782 Silver ink.

In another embodiment, wherein the conductive ink solution comprises 65-75% DuPont e782 Silver ink, 15-25% graphite, and 5-15% neodymium.

In another embodiment, the method further comprises further comprising moving the squeegee of the printing unit back and forth over the press screen to dispense a preset amount of conductive ink solution at a preset pressure on the foil through the press screen to create a second antenna on the foil of 5-255 mm in length, 0.05-5 mm in width, and a thickness of 0.05-0.9 nm; and mounting a third and fourth resonance amplifiers to the unrolled foil at at least two points of the second antenna.

In another embodiment, the preset pressure is 1-3 bar. In another embodiment, the preset amount of conductive ink is 195-205 ml.

Several embodiments have been shown and described in accordance with the present invention. It should be understood that the above description is intended to be illustrative. Many other embodiments will be apparent to those of skill in the art upon reading and understanding the above description. The invention is not so limited and is susceptible of numerous changes and modifications as known to those skilled in the art and intend to cover all such changes and modifications as are encompassed by the scope of the appended claims, along with the full scope of equivalents to which such claims are entitled.

DETAILED DESCRIPTION

Figure 1:
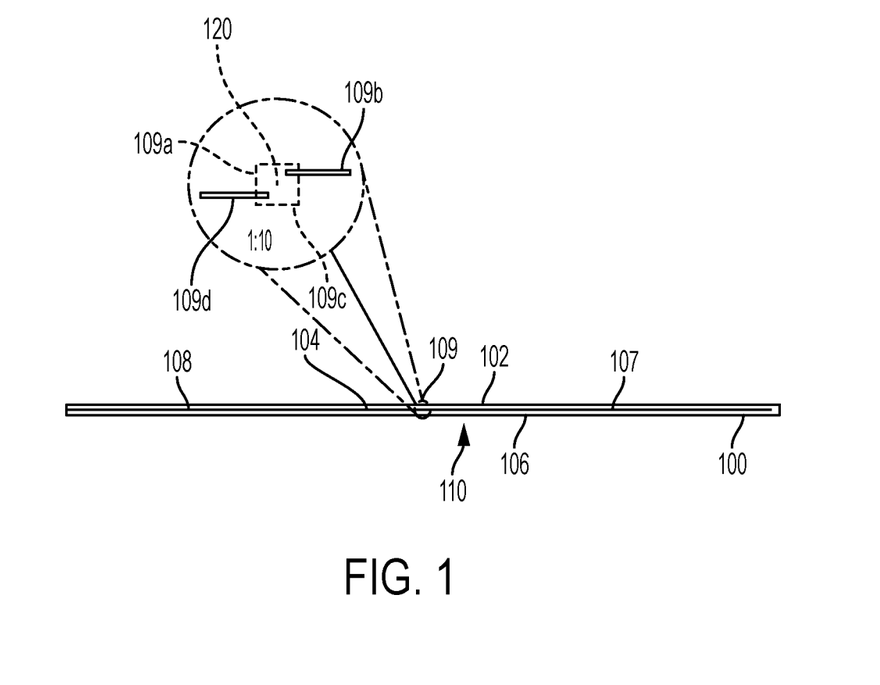
FIG. 1 depicts a top view of a RFID tag according to one aspect of the invention.
Figure 2:
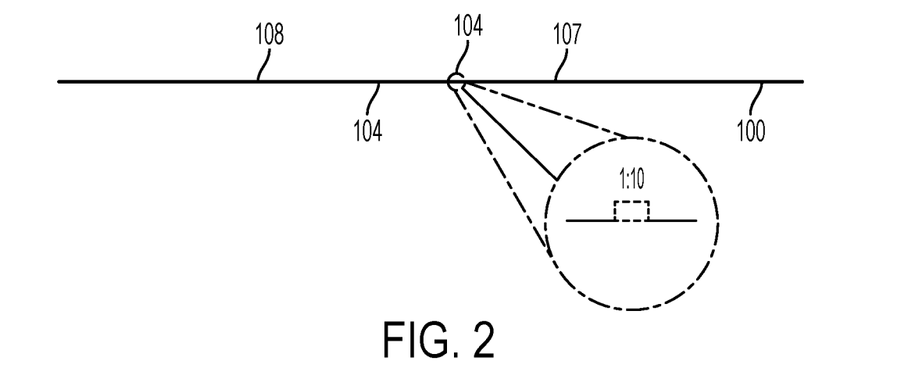
FIG. 2 depicts a side, cross-sectional view of an RFID tag according to one aspect of the invention.

FIGS. 1 and 2 depict a top and side view of RFID tag 100, with a first flexible substrate 102 and second flexible 106 substrate. The first flexible substrate 102 and second flexible substrate 106 are preferably made from a flexible, waterproof material. Suitable materials for the first flexible substrate 102 and second flexible substrate 106 include kapton, polyethylene terephthalate (PET) polymide, textile, paper, and even human or animal skin. Dimensions for the first flexible substrate 102 and second flexible substrate 106 are preferably 155 nm (nanometers) in length each, with a width of 2 mm and thickness of 0.2 mm, but can be made to be 5 to 255 nm in length, 2 to 100 mm in width, and with a thickness of 0.2 to 2 mm. The first substrate 102 houses a first substrate carrier foil 104. The first substrate foil carrier 104 preferably has two preferably needle shaped antennas 107 and 108 printed thereon from a conductive ink solution. The two needle shaped antennas 107 and 108 are preferably symmetrically offset across a longitudinal centerline, but they do not need to be symmetrically offset. The two antennas are connected to a Ultra High Frequency (UHF) RFID integrated circuit 109 at four offset points 109a, 109b, 109c, and 109d. There are also preferably four resonance amplifiers (not pictured) printed on the first substrate carrier foil at the at four offset points 109a, 109b, 109c, 109d. The two needle shaped antennas are 5 to 255 mm in length, and preferably 75 mm in length, 0.005 mm to 5 mm in width, and preferably 0.05 mm in width.

Alternatively, a single antenna can be used of 5 to 255 nm in length, and preferably 75 nm in length, 0.005 to 5 nm in width and preferably 0.005 nm in width, with a thickness of 0.05-0.9 nm. The single antenna configuration requires at least two resonance amplifiers printed on the substrate at each end of the antenna.

The substrate carrier foil 104 is preferably made of ST 505PET polymide, polyester, or kapton, or a combination ST 505PET polymide and kapton laminate. Other suitable materials include textile, paper, and human and animal skin.

The second flexible substrate carrier 106 is configured to cover the first substrate carrier 102 and the UHF RFID circuit connected to the substrate carrier foil 104.

The conductive ink solution bused to create antennas comprises 65-75% DuPont e782 Silver ink, 15-25% graphite, and 5-15% neodymium. Preferably, the conductive ink solution comprises 700/o DuPont e782 Silver ink, 20% graphite, and 10% neodymium. Using the conductive ink solution offers significant advantages over prior art designs which use conductive thread to create antennas. Those advantages include the ability to create smaller and thinner tags that are less susceptible to breaking, that include antennas created form more than one layer of conductive material on the substrate, which in turn enables enhanced reading performance.

The preferred dimensions of RFID tag 100 are 2.00 mm in thickness with a length of 150 mm. Other feasible dimensions include a length of 5 to 255 nm, width of 2-100 mm, and thickness of 0.2-2 mm.

Figure 3:
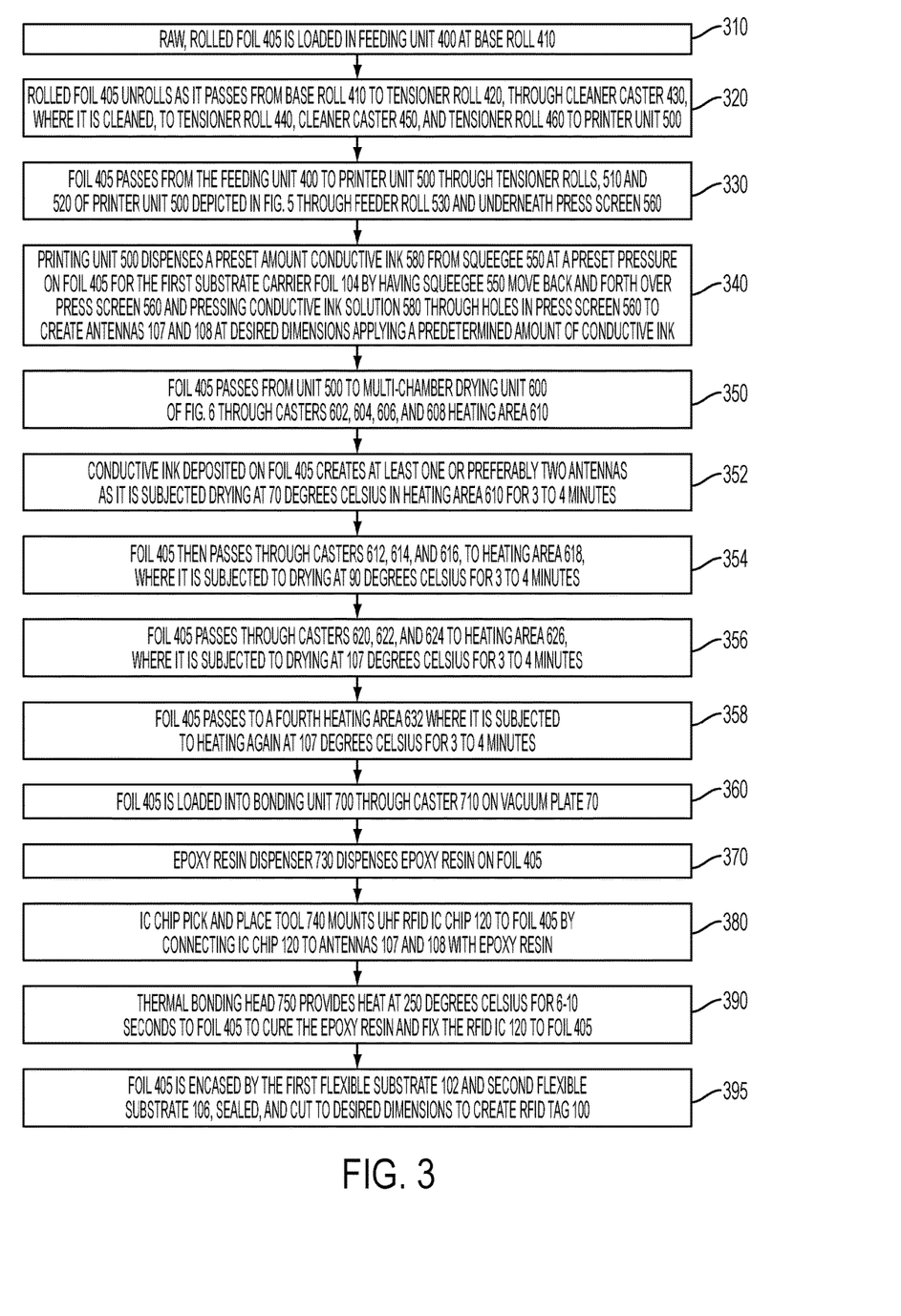
FIG. 3 is a flow chart describing steps for manufacturing an RFID tag according to one aspect of the invention.

FIG. 3. is a flow chart that describes the steps for manufacturing RFID tag 100. At step 310, raw, rolled foil is loaded in feeding unit 400 depicted in FIG. 4 at base roll 410. The dimensions of the roiled foil 410 are preferably. The rolled foil is used for the first foil substrate 10.

Figure 4:
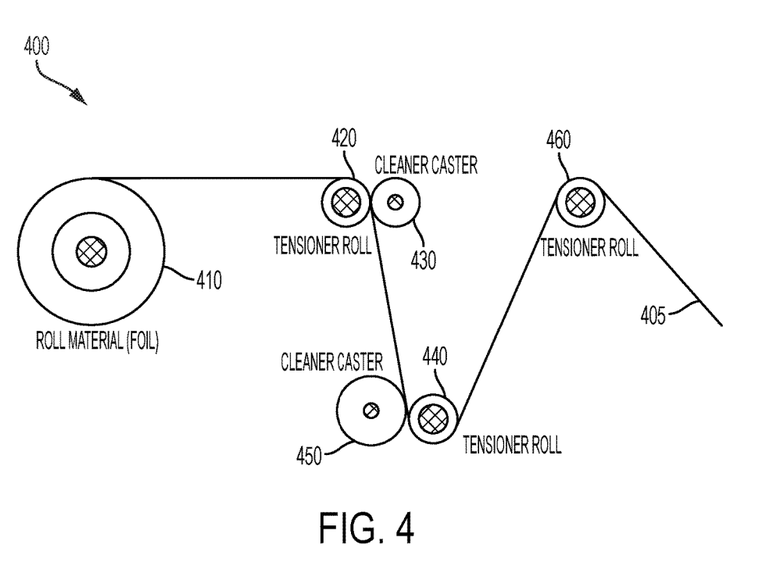
FIG. 4 depicts a foil loading unit used to manufacture an RFID tag according to one aspect of the invention.

At step 320, the rolled foil 405 unrolls as it passes from base roll 410 to tensioner roll 420, through cleaner caster 430, where it is cleaned, to tensioner roll 440, cleaner caster 450, and tensioner roll 460 to printer unit 500. The cleaning process ensures an antistatic environment. If dust is applied to the substrates prior to or during the printing process, it may cause defects in the resulting tag or affect the performance of the resulting tag.

Figure 5A:
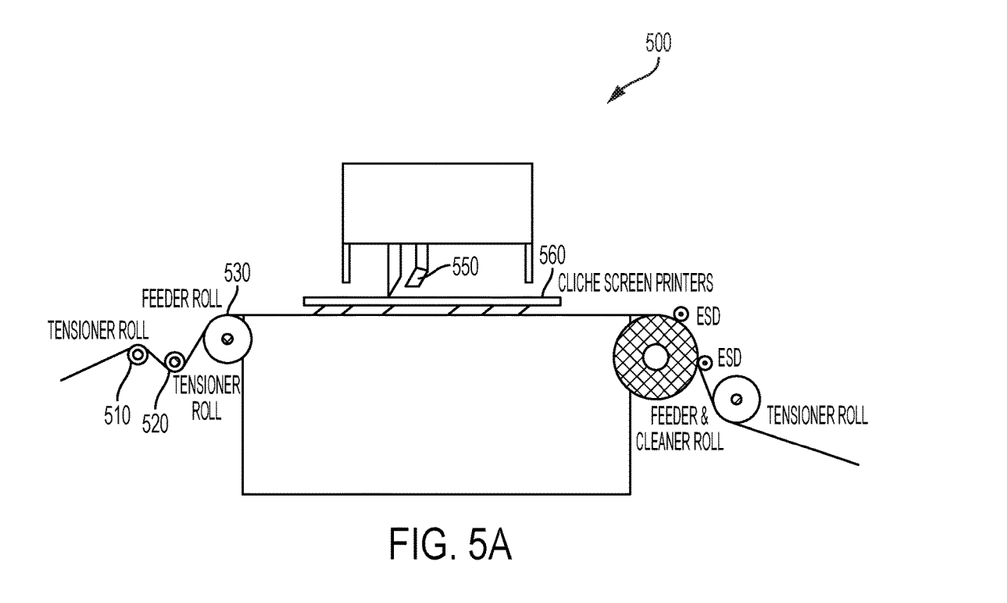
FIG. 5A depicts a printer unit used to dispense a conductive ink solution and print antennas in manufacturing an RFID tag according to one aspect of the invention.
Figure 5B:
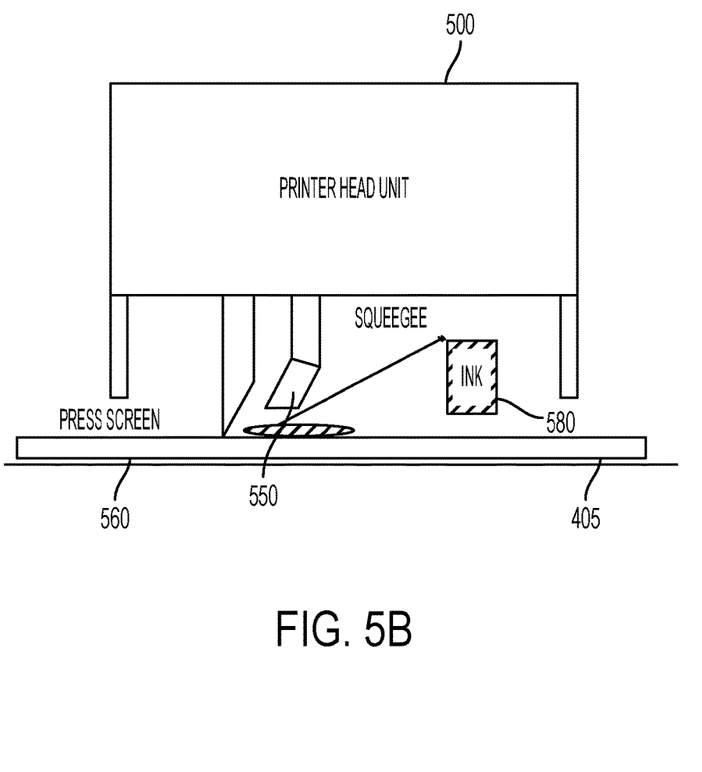
FIG. 5B depicts the printer head unit of the printing unit of FIG. 5 in greater detail.

At step 330, the foil 405 passes from the feeding unit 400 of FIG. 4 to printer unit 500 depicted in FIGS. 5A and 5B through tensioner rolls, 510 and 520 of printer unit 500 depicted in FIG. 5 through feeder roll 530 and underneath press screen 560. The feeding unit 400 is preferably integrated with printing unit 500, but the units can be separated.

At step 340, printing unit 500 dispenses a preset amount conductive ink 580 from squeegee 550 at a preset pressure of 1 to 3 bar, and preferably 2 bar, on foil 405 for the first substrate carrier foil 104 by having squeegee 550 move back and forth over press screen 560 and pressing conductive ink solution 580 through holes in press screen 560 to create antennas 107 and 108 as depicted in FIGS. 1 and 2 at desired dimensions applying approximately 195 to 205 ml of conductive ink per antenna. The press screen has a high resolution of 155 to 165, and preferably 160 micron/cm$^2$. This process allows for printing of multiple layers on the same substrate to form the antenna, which is believed to result in enhanced durability and reading performance.

Figure 6:
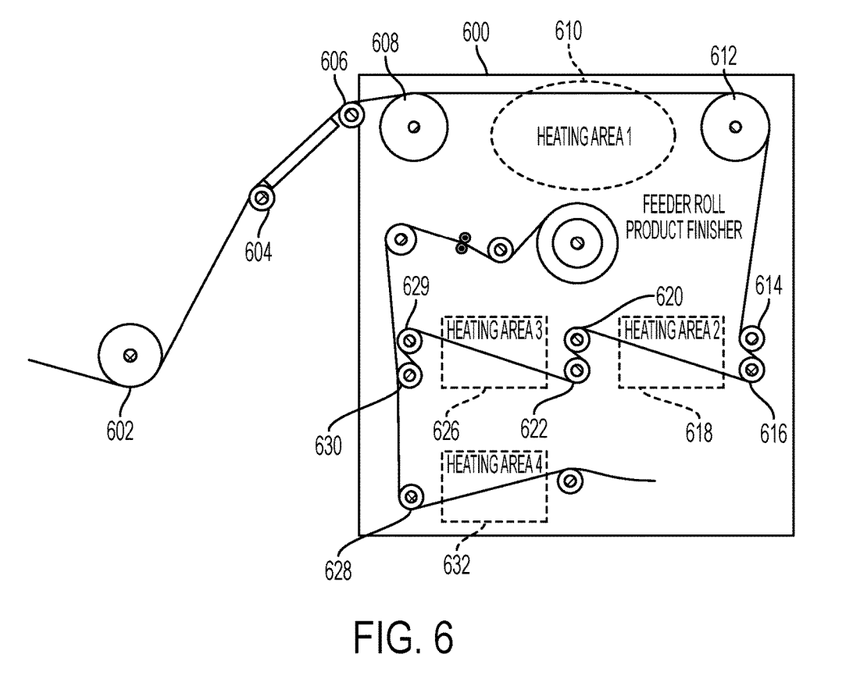
FIG. 6 depicts a multi-chamber dryer unit used in the process of manufacturing an RFID tag according to one aspect of the invention.

At step 350, the foil 405 passes from unit 500 to multi-chamber drying unit 600 of FIG. 6 through casters 602, 604, 606, and 608 heating area 610. The printing unit 500, is preferably integrated with the feeding unit 400, printing unit 500, and multi-chamber drying unit 600, but the units can be separated. The foil 405 is to be used for the first substrate carrier foil 104. At step 352, the conductive ink deposited on foil 405 creates at least one or preferably two antennas as it is subjected drying at 70 degrees Celsius in heating area 610 for 3-4, and preferably 3.75 minutes. At step 354, foil 405 then passes through casters 612, 614, and 616, to heating area 618, where it is subjected to drying at 90 degrees Celsius for 3-4, and preferably 3.75 minutes. At step 356, foil 405 passes through casters 620, 622, and 624 to heating area 626, where it is subjected to drying at 107 degrees Celsius for 3-4, and preferably 3.75 minutes. At step 358, foil 405 passes from casters 629 and 630 to a fourth heating area 632 where it is subjected to heating again at 107 degrees Celsius for 3-4, and preferably 3.75 minutes.

The above drying step is described using four heating areas, but other variations may be able to be used, such as using fewer heating areas at different temperatures.

Figure 7:
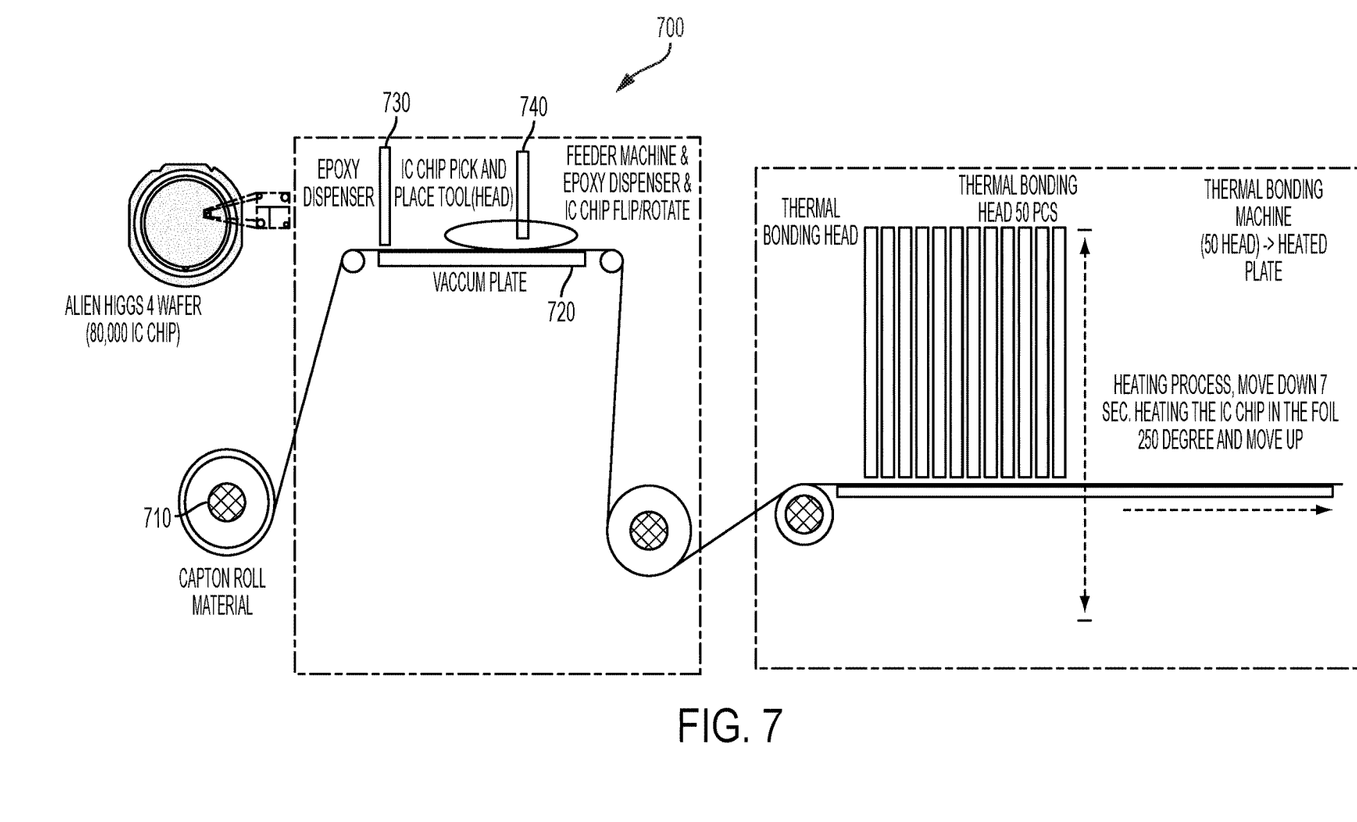
FIG. 7 depicts the bonding process used to manufacture an RFID tag according to one aspect of the invention.

At step 360, after drying the antennas, foil 405 is loaded into bonding unit 700 of FIG. 7 through caster 710 on vacuum plate 720. The bonding unit 700 is preferably integrated with the feeding unit 400, printing unit 500, and multi-chamber drying unit 600, but the units can be separated.

At step 370, epoxy resin dispenser 730 dispenses epoxy resin on foil 405.

At step 380, IC chip pick and place tool 740 mount UHF RFID IC chip 120 to foil 405 by connecting IC chip 120 to antennas 107 and 108 with epoxy resin.

At step 390, thermal bonding head 750 provides heat at 225-275, and preferably 250 degrees Celsius for 6-10 and preferably 8 seconds to foil 405 to cure the epoxy resin and fix the RFID IC 120 to foil 405.

At step 395, foil 405 is encased by the first flexible substrate 102 and second flexible substrate 106, sealed, and cut to desired dimensions to create RFID tag 100.

RFID tag 100 can be used with different types of readers for a wide variety of applications. It is waterproof and made of materials able to withstand high pressure, hot and cold temperatures, and durable enough be used in a wide variety of applications, including being attached affixed, to, woven in, or otherwise enclosed within clothing, towels, linen, or other laundry that is washed in washing machines, or affixed to other products, including consumer products, food products, and other goods and inventory. Such tags are capable of reuse in certain applications.

For example, RFID tag 100 can be used with a mobile (Ultra High Frequency) UHF reader that can scan up to 150 tags per second at a range of up to 4 meters. The mobile reader contains an interface that can connect with smartphones or tablets without modifying the reader using Bluetooth and other forms of wireless communication. It preferably uses an octagonal shaped kapton/polymide flexible foil antenna.

RFID tag 100 also can be used with a smart case reader such as those generally known to persons skilled in the art. RFID tag 100 also can be used with a gate reader designed for retail environments that includes one or two pieces of asynchronously connected UHF RFID reader modules and 2 to 8 pieces of 1000 mm×500 mm flexible polyester antennas, with an outer case made from carbon fiber and glass fiber alloy capable of shielding and diverting the attention of radio waves. It can scan up to 950 tags per second in a range of up to 10 meters.

The invention has been described in terms of particular embodiments. The alternatives described herein are examples for illustration only and not to limit the alternatives in any way. Certain steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. An RFID tag comprising:
    a first substrate carrier comprising a flexible waterproof material and configured to include a substrate carrier foil comprising at least a first antenna printed on the substrate carrier foil from a conductive ink liquid solution;
    at least first and second resonance amplifiers printed on the substrate carrier foil and connected to the at least first antenna;
    a UHF RFID circuit integrated into the substrate carrier foil at the first antenna; and
    a second substrate carrier comprising a flexible waterproof material configured to cover the first substrate carrier and the UHF RFID circuit, wherein the substrate carrier foil comprises kapton and the first antenna has a length of 5 to 255 mm, a width of 0.005 to 5 mm, and a thickness of 0.05 to 9 nm,
    wherein the conductive ink solution comprises 65-75% DuPont e782 Silver ink, 15-25% graphite, and 5-15% neodymium.

2. The RFID tag of claim 1, wherein the substrate carrier foil comprises ST505 PET polymide.

3. The RFID tag of claim 2, wherein the substrate carrier foil further comprises polyester.

4. The RFID tag of claim 2, further comprising a second antenna printed on the substrate carrier foil from the conductive ink solution, wherein the second antenna has a length of 5 to 255 mm, a width of 0.005 to 5 mm, and a thickness of 0.05 nm to 0.9 nm.

5. The RFID tag of claim 2, further comprising a second antenna printed on the substrate carrier foil from the conductive ink solution, wherein the second antenna has a length of 5 to 255 mm, a width of 0.005 to 5 mm, and a thickness of 0.05 to 0.9 nm and the first antenna and the second antenna are symmetrically offset across a longitudinal centerline at at least four offset points, further comprising a third and fourth resonance amplifier, wherein the third and fourth resonance amplifiers are printed on the substrate carrier foil at two of the four offset points.

6. The RFID tag of claim 2, configured to read at least 150 tags per second at a range of up to 4 meters using a mobile UHF reader or at least 950 tags per second at a distance of up to 10 meters using a gate reader.

7. The RFID tag of claim 3, wherein the substrate carrier foil further comprises kapton laminate.

8. The RFID tag of claim 3, further comprising a second antenna printed on the substrate carrier foil from the conductive ink solution, wherein the second antenna has a length of 5 to 255 mm, a width of 0.005 to 5 mm, and a thickness of 0.05 to 0.9 nm.

9. The RFID tag of claim 3, further comprising a second antenna printed on the substrate carrier foil from the conductive ink solution, wherein the second antenna has a length of 5 to 255 mm, a width of 0.005 to 5 mm, and a thickness of 0.05 to 0.9 nm and the first antenna and the second antenna are symmetrically offset across a longitudinal centerline at at least four offset points, further comprising a second resonance amplifier, wherein the first and second resonance amplifiers are printed on the first substrate carrier foil at the four offset points.

10. The RFID tag of claim 3, configured to read at least 150 tags per second at a range of up to 4 meters using a mobile UHF reader or rd at least 950 tags per second at a distance of up to 10 meters using a gate reader.

11. The RFID tag of claim 7, further comprising a second antenna printed on the substrate carrier foil from the conductive ink solution, wherein the second antenna has a length of 5 to 255 mm, a width of 0.005 to 5 mm, and a thickness of 0.05 to 0.9 nm.

12. The RFID tag of claim 7, further comprising a second antenna printed on the substrate carrier foil from the conductive ink solution, wherein the second antenna has a length of 5 to 255 mm, a width of 0.005 to 5 mm, and a thickness of 0.05 to 0.9 mm and the first antenna and the second antenna are symmetrically offset across a longitudinal centerline at at least four offset points, further comprising a second resonance amplifier, wherein the first and second resonance amplifiers are printed on the first substrate carrier at the four offset points.

13. The RFID tag of claim 7, configured to read at least 150 tags per second at a range of up to 4 meters using a mobile UHF reader or at least 950 tags per second at a distance of up to 10 meters using a gate reader.

14. The RFID tag of claim 11, configured to read at least 150 tags per second at a range of up to 4 meters using a mobile UHF reader or at least 950 tags per second at a distance of up to 10 meters using a gate reader.

15. The RFID tag of claim 4, configured to read at least 150 tags per second at a range of up to 4 meters using a mobile UHF reader or read at least 950 tags per second at a distance of up to 10 meters using a gate reader.

16. The RFID tag of claim 8, configured to read at least 150 tags per second at a range of up to 4 meters using a mobile UHF reader or at least 950 tags per second at a distance of up to 10 meters using a gate reader.

17. The RFID tag of claim 5, configured to read at least 150 tags per second at a range of up to 4 meters using a mobile UHF reader or read at least 950 tags per second at a distance of up to 10 meters using a gate reader.

18. The RFID tag of claim 9, configured to read at least 150 tags per second at a range of up to 4 meters using a mobile UHF reader or read at least 950 tags per second at a distance of up to 10 meters using a gate reader.

19. The RFID tag of claim 12, configured to read at least 150 tags per second at a range of up to 4 meters using a mobile UHF reader or read at least 950 tags per second at a distance of up to 10 meters using a gate reader.

20. The RFID tag of claim 1, configured to read at least 150 tags per second at a range of up to 4 meters using a mobile UHF reader or read at least 950 tags per second at a distance of up to 10 meters using a gate reader.

21. A method of manufacturing an RFID tag comprising:
loading rolled foil in a feeding unit;
unrolling the foil to a printer unit comprising a squeegee and press screen having holes;
passing the unrolled foil underneath the press screen;
moving the squeegee of the printing unit back and forth over the press screen to dispense a preset amount of conductive ink solution at a preset pressure on the foil through the press screen to create at least one antenna on the foil of 5-255 mm in length, 0.05-5 mm in width, and a thickness of 0.05-0.9 nm;
passing the unrolled foil to a drying unit;
subjecting the unrolled foil to heat in at least two heating units to dry the at least two needle shaped antennas on the foil;
loading the unrolled foil in a bonding unit;
dispensing epoxy resin from the bonding to the unrolled foil;
mounting an ultra-high frequency (UHF) RFID integrated circuit to the unrolled foil with the epoxy resin at at least two points of the at least one antenna;
mounting at least two resonance amplifiers to the unrolled foil at at least two points of the antenna;
placing the foil in a first, flexible, waterproof substrate carrier and covering and sealing the first substrate carrier with second flexible, waterproof substrate carrier configured to cover the first substrate carrier and the UHF RFID circuit,
wherein the conductive ink solution comprises 65-75% DuPont e782 Silver ink, 15-25% graphite, and 5-15% neodymium.

22. The method of manufacturing of claim 21, wherein the unrolled foil comprises kapton.

23. The method of manufacturing of claim 21, wherein the unrolled foil comprises ST505 PET polymide.

24. The method of manufacturing of claim 21, wherein the unrolled foil comprises polyester.

25. The method of manufacturing of claim 21, wherein the unrolled foil further comprises kapton laminate.

26. The method of manufacturing of claim 21, wherein the preset pressure is 1-3 bar.

27. The method of manufacturing of claim 26, further comprising moving the squeegee of the printing unit back and forth over the press screen to dispense a preset amount of conductive ink solution at a preset pressure on the foil through the press screen to create a second antenna on the foil of 5-255 mm in length, 0.05-5 mm in width, and a thickness of 0.05-0.9 nm; and mounting a third and fourth resonance amplifiers to the unrolled foil at at least two points of the second antenna.

28. The method of manufacturing of claim 26, wherein the preset amount of conductive ink is 195-205 ml.

29. The method of manufacturing of claim 28, wherein the drying unit comprises four heating areas, a first heating area where the unrolled foil is subjected drying at 70 degrees Celsius in heating area 610 for 3 to 4 minutes, a second heating area where the unrolled foil is subjected to drying at 90 degrees Celsius for 3 to 4 minutes, a third heating area, where the unrolled foil is subjected to drying at 107 degrees Celsius for 3 to 4 minutes, and a fourth heating area where the unrolled foil is subjected to heating again at 107 degrees Celsius for 3 to 4 minutes.

* * * * *

UNITED STATES PATENT AND TRADEMARK OFFICE
CERTIFICATE OF CORRECTION

PATENT NO. : 9,886,661 B1  
APPLICATION NO. : 15/342779  
DATED : February 6, 2018  
INVENTOR(S) : Tercsinecz Page 1 of 1

It is certified that error appears in the above-identified patent and that said Letters Patent is hereby corrected as shown below:

In the Specification

| | |
|---|---|
| Column 3, Line 32: | delete "and" |
| Column 3, Line 33: | replace "9 mm" with "9 nm" |
| Column 3, Line 43: | replace "9 mm" with "9 nm" |
| Column 3, Line 43: | delete "and" |
| Column 3, Line 48: | delete "and" |
| Column 3, Line 49: | replace "9 mm" with "9 nm" |
| Column 5, Line 18: | replace "155 nm" with "155 mm" |
| Column 5, Line 18: | replace the word "nanometers" with "millimeters" |
| Column 5, Line 20: | replace "255 nm" with "255 mm" |
| Column 5, Line 36: | replace "255 nm" with "255 mm" |
| Column 5, Line 37: | replace "75 nm" with "75 mm" |
| Column 5, Line 37: | replace "5 nm" with "5 mm" |
| Column 5, Line 38: | replace "0.005 nm" with "0.005 mm" |
| Column 5, Line 63: | replace "255 nm" with "255 mm" |

In the Claims

| | |
|---|---|
| Column 7, Line 62 Claim 1: | replace "9 nm" with "0.9 nm" |

Signed and Sealed this  
Eighteenth Day of December, 2018

Andrei Iancu  
*Director of the United States Patent and Trademark Office*